United States Patent
Gustafsson et al.

(10) Patent No.: US 7,891,681 B2
(45) Date of Patent: Feb. 22, 2011

(54) STEERING DAMPER AND DEVICE FOR MOUNTING A STEERING DAMPER

(75) Inventors: Leif Gustafsson, Holmsjö (SE); Lars Jansson, Enskede (SE)

(73) Assignee: Ohlins Racing AB (SE)

( * ) Notice: Subject to any disclaimer, the term of this patent is extended or adjusted under 35 U.S.C. 154(b) by 0 days.

(21) Appl. No.: 12/529,571

(22) PCT Filed: Mar. 5, 2008

(86) PCT No.: PCT/SE2008/050244

§ 371 (c)(1),
(2), (4) Date: Sep. 8, 2009

(87) PCT Pub. No.: WO2008/108731

PCT Pub. Date: Sep. 12, 2008

(65) Prior Publication Data

US 2010/0084833 A1    Apr. 8, 2010

(30) Foreign Application Priority Data

Mar. 5, 2007  (SE) ................ 0700556-4
Mar. 5, 2007  (SE) ................ 0700557-2

(51) Int. Cl.
B62D 7/22 (2006.01)

(52) U.S. Cl. ........................ 280/89; 280/272

(58) Field of Classification Search .......... 280/779, 280/89, 89.12, 90, 91.1, 272; 188/306
See application file for complete search history.

(56) References Cited

U.S. PATENT DOCUMENTS

| 1,957,997 | A | * | 5/1934 | Fieldman | .................... 188/310 |
| 2,084,001 | A | * | 6/1937 | Mcginnes | .................... 188/306 |
| 4,700,963 | A | | 10/1987 | Burns et al. | |
| 4,773,514 | A | | 9/1988 | Gustafsson | |
| 5,927,740 | A | | 7/1999 | Hopey | |
| 6,817,265 | B2 | * | 11/2004 | Hasegawa et al. | .......... 74/551.1 |

(Continued)

FOREIGN PATENT DOCUMENTS

EP    1248013 A2    10/2002

(Continued)

OTHER PUBLICATIONS

International Search Report for PCT/SE2008/050244.

*Primary Examiner*—Faye M. Fleming
(74) *Attorney, Agent, or Firm*—Brooks Kushman P.C.

(57) ABSTRACT

A steering clamper designed for use on a vehicle handlebar connected to a part rotatable about a steering axle coinciding with the center of a steering column. The steering damper comprises an outer housing enclosing a damping-medium-filled main chamber divided into two chambers by a demarcating wing rotatable about a first wing end. The outer face of the wing end rotates in a cutout in the housing. The first wing end is fixed to a first end of a lever which rotates relative to said outer housing. The lever connects, the steering damper rotating with the steering device to the vehicle frame. In the outer housing there is a cavity, the center line of which coincides with the steering axle, designed to accommodate a fastening element which joins the steering damper to the part rotatable about the steering axle.

23 Claims, 9 Drawing Sheets

U.S. PATENT DOCUMENTS

| | | | |
|---|---|---|---|
| 6,824,153 B2 * | 11/2004 | Hanawa et al. | 280/272 |
| 6,848,698 B2 * | 2/2005 | Hasegawa et al. | 280/272 |
| 6,907,968 B2 * | 6/2005 | Biasiotto et al. | 188/306 |
| 7,021,433 B2 * | 4/2006 | Yamada et al. | 188/294 |
| 2004/0200680 A1 * | 10/2004 | Yamada et al. | 188/293 |

FOREIGN PATENT DOCUMENTS

| | | |
|---|---|---|
| EP | 1291276 A2 | 3/2003 |
| EP | 1705397 A2 | 9/2006 |
| WO | 86/03267 A1 | 6/1986 |
| WO | 2005/035349 A1 | 4/2005 |

* cited by examiner

STEERING DAMPER AND DEVICE FOR MOUNTING A STEERING DAMPER

TECHNICAL FIELD

The invention relates to a steering damper and a mounting fixture for a steering damper designed for use on a two or four-wheeled vehicle having a steering device comprising a handlebar rotatable about a steering axle, preferably a motorcycle or an ATV. The steering damper is mounted in the steering device and is also connected to the frame or the chassis via the mounting fixture. The damper is made up of an outer housing, in which a damping-medium-filled main chamber is configured. The main chamber is divided into two chambers by a demarcating arm rotatable about a first end. In the first end of the arm there is fixed a lever, which rotates with said demarcating arm in relation to said outer housing. The lever is a part of the mounting fixture.

BACKGROUND OF THE INVENTION

A steering damper is fitted between the rotary handlebar of a vehicle and its fixed frame or chassis to dampen shocks and violent movements which are transmitted from the front wheel(s) to the handlebar. Where the steering damper is used on a motorcycle, it can also solve the problem of wobbling, which can occur in a motorcycle at high speeds. Wobbling means that the front wheel of the motorcycle begins to oscillate with increased amplitude about the steering axle. Where the steering damper is used on a four-wheeled all-terrain vehicle, a so-called ATV, the steering damper is primarily designed to dampen out the rapid steering movements caused by, for example, an asymmetric load upon the wheels.

The steering damper is not standard on all vehicles, but is a product which is suitable for retrofitting to improve the handling characteristics of the vehicle. Of course, an original fitting of the steering damper is also possible. Both when the damper is originally fitted and when it is retrofitted, it is an advantage if as few specially manufactured parts as possible need to be used.

In the prior art, for example in the Applicant's own product SD 410, which is a wing damper using technology drawn from U.S. Pat. No. 4,773,514, the damper body is fixed to the mounting brackets of the handlebar by means of a specially manufactured clamp. See prior art, FIG. 1, and detailed description in the specific part. The aim is for the center of rotation of the steering damper to coincide, when fitted, to the steering axle of the vehicle. The mounting bracket which connects the steering damper to the frame can be fixed in a number of different ways, depending on the motorcycle make, model and year.

This securement of the steering damper to the vehicle means a simple assembly, which can also be carried out by the end customer himself, and easily accessible adjusting knobs for modifying the damping characteristics.

Drawbacks with this mounting are that on modern-day motorcycles and ATVs there are no standard dimensions for the placement or diameter of the handlebar or for the distance between steering head and frame. A very large number of clamp versions are therefore needed to allow the damper body to be fitted.

The above-described assembly also results in the steering damper often being the highest point on the handlebar, which means that the steering damper can easily be damaged as a result of its placement.

Other known steering dampers are shown in, for example, EP 1291276, U.S. Pat. No. 4,773,514 and in WO 2005035349A.

In both EP 1291276 and U.S. Pat. No. 4,773,514, a rotation damper in the form of a wing damper is shown, in which the damper consists of a housing having a sector-shaped cutout in which a wing-shaped arm is rotated in a damping medium. Also present in the housing are channels, which can be adjusted to regulate the flow between the two chambers formed by the housing and the wing-shaped arm. In EP 1291276, the steering damper is mounted on the frame, substantially behind the handlebar, and the wing-shaped arm is connected to the rotary steering axle of the motorcycle via a protruding shaft. In U.S. Pat. No. 4,773,514, the steering damper is fixedly mounted on a fork crown of the motorcycle behind the handlebar and the center of rotation of the wing-shaped arm is via a mounting bracket consisting of a lever and an extension pin connected to the frame.

The placement of the steering damper behind the handlebar, yet with the center of rotation of the steering damper still coinciding with the steering axle of the motorcycle, is difficult to realize, due to lack of space, without modifying the fork crown. Moreover, the steering damper and its outer parts come so close to the driver that they can inconvenience him.

In WO 2005035349, a steering damper in the form of a double-armed wing damper is described, which is designed for use on a motorcycle in which the steering column, i.e. in this case also the steering axle, extends through its center and in which the fork crown is fastened in the steering column with a retaining nut. The steering damper is shown fitted both above (FIG. 3) and below the fork crown (FIG. 5). This double-armed wing damper does not have a lever for connecting the steering device to the frame, but rather the outer housing is directly fitted in the control column and the double-action wing is fixed directly in the control column. In FIG. 5, the rotary arms are connected to the rotary steering axle via a locking member and to the fixed frame via a clamping joint clamped around the steering column. The solution according to FIG. 5 requires specially manufactured parts, for example an extended steering column or a modified steering head, which adds to the costs involved in retrofitting the steering damper.

U.S. Pat. No. 5,927,740 shows another type of steering damper, which is integrated in the steering column. In this solution, the steering damper housing is fixedly built together with the steering axle and the moving internal parts of the damper are made to rotate by virtue of being connected to the frame and the steering column via an arm connected to the upper bearing device. Dampers fitted in the steering column involve the damper preferably being fitted in the vehicle already in the original production, with the result that the steering damper cannot be fitted as an extra accessory on a vehicle having a lower purchase price. Moreover, the pretensioning of the bearing device is complicated, since the whole of the steering damper is used as a force-producing member and a sufficiently precise pretensioning is difficult to achieve.

OBJECT OF THE INVENTION

The object of the present invention is to solve the problem of designing a shock absorber in which the center of rotation of the steering damper coincides with the steering axle of a vehicle, while the steering damper retains a space-efficient, low assembly height.

A further object of the invention is to solve this problem in a way which allows a simple assembly with the use of just a small number of specially manufactured components.

Moreover, the invention solves the problem without any modifications needing to be made to the steering device.

The invention also sets out to solve the problem of joining a wing of the steering damper rotating about the steering axle to the frame parts of a vehicle. The invention aims to solve this problem by a new type of mounting fixture which is easily adaptable to different vehicle models without too many special parts needing to be produced.

The invention further sets out to solve this problem in a way which allows a simple fitting of the steering damper so that it is easily accessible for the driver.

Moreover, the invention solves the problem without excessive forces arising between the steering damper and the mounting member.

SUMMARY OF THE INVENTION

The invention relates to a steering damper designed for use on a vehicle which has a handlebar connected to a part rotatable about a steering axle coinciding with the center of a steering column. The vehicle is preferably a cycle, motorcycle or a four-wheeled ATV.

The steering damper comprises an outer housing enclosing a damping-medium-filled main chamber divided into two chambers by a demarcating wing rotatable about a first wing end. The outer face of the wing end rotates in a custom-made cutout in the housing and in the first wing end there is also fixed a first end of a lever. The first lever end rotates about the steering axle together with the wing in relation to said outer housing. Via a mounting fixture at the other end of the lever, the lever also connects the steering damper rotating with the steering device to the vehicle frame.

In the outer housing a cavity is provided, the centre line of which coincides with the steering axle. The diameter of this cavity is designed to accommodate at least the fastening element which joins the steering damper to the part rotatable about the steering axle.

By virtue of this design, the fastening element can be partially introduced into the outer housing and a more compact and space-efficient steering damper is thereby produced.

Arranged around the cavity is a flange, joined at right angles to the lever, which likewise extends into the outer housing.

In order to further compress the height of the damper, the wing and the lever are arranged close together in the vertical direction. This is possible by virtue of the fact that a cavity in the first wing end is matched to the outer face of the flange, so that the first wing end partially encloses the flange.

The lever and the wing are also locked together in the rotational direction by virtue of the fact that the outer face of the flange and the inner face of the first wing end are locked in place relative to each other.

In order not to lock the steering damper in the rotational direction, yet at the same time join the part rotatable about the steering axle to the steering column, the outer face of the fastening element rotates freely in the cavity in the lever. The inner face of the fastening element at the same time comprises a thread, which cooperates with a threaded part on or connected to the control column.

In a first embodiment of the invention, the steering damper is designed for use on a motorcycle in which the part rotatable about the steering axle is a fork crown.

In order to produce a flexible steering damper which can easily be adapted to different motorcycle models without the need to damage the vehicle, the fastening element is designed to lock both the steering column and the outer housing of the steering damper onto the fork crown. The locking is effected by the fastening element pressing on a fixing plate joined to the outer housing via a locking joint consisting of screws or bolts. As a result of the tightening torque with which the fastening element is tightened, a force is produced which connects the fixing plate to the fork crown. The connection prevents rotation between the fork crown and the outer housing. Preferably, this connection and rotation-locking are produced by the arrangement of protrusions in or on the fixing plate, which are pressed down into the fork crown.

In a second embodiment of the invention, the steering damper is designed for use on a four-wheeled ATV in which the part rotatable about the steering axle is a steering spindle to which the steering arms are connected. The steering damper is fitted to the lower end of the steering column and the fastening element which fixes the steering spindle to the steering column is partially inserted in the outer housing of the steering damper through the cavity in the first end of the lever. The fastening element also locks the wing disposed in the steering damper onto the rotary steering column. The outer housing is locked onto the frame via an extra screw joint.

The invention also relates to a device for securing a steering damper to a vehicle frame. The vehicle frame includes a steering head and an upper steering bearing pretensioned by a retaining nut and on the frame there is fitted a steering device rotating about the steering axle and the steering column. The steering device includes a handlebar connected via steering brackets to a fork crown. An outer housing belonging to the steering damper is fitted to the steering device, in which the outer housing encloses a damping-medium-filled main chamber divided into two chambers by a demarcating wing rotatable about a first wing end. The outer face of the wing end rotates in a custom-made cutout in the housing and in the first wing end there is also fixed a lever which rotates with the wing in relation to said outer housing. The lever is designed to connect the wing of the steering damper rotating with the steering device to the vehicle frame. This connection is realized by the lever being connected via a mounting bracket to a mounting fixture consisting of a flange joined to an outer ring. The outer ring is designed to be pressed down into an upper part of the steering head and to cooperate with the upper steering bearing.

By virtue of this design, a simple securement and connection of the rotary arm of the steering damper to the vehicle frame is produced. The securement does not require any modifications to the existing frame or the special production of mounting brackets.

In a preferred embodiment of the invention, the upper steering bearing which is introduced into the outer ring is a modification of the original steering bearing. The modification which is made is that from the complete steering bearing is removed the outer bearing ring of the bearing, so that the antifriction rollers are exposed.

The antifriction rollers of the modified steering bearing are designed to cooperate with the inner face of the outer ring in such a way that the inner face of the outer ring acts as the outer bearing ring of the steering bearing. The inner face of the outer ring is preferably conically configured to match the bearing. The steering bearing is also fully submerged in the outer ring to reduce the overall height of the construction.

In a further embodiment, the steering bearing is pretensioned by the ordinary retaining nut of the steering bearing. The retaining nut is screwed to a threaded part of the upper part of the steering column and affixes a face in the form of the upper sealing washer of the steering bearing.

In order to prevent large forces from arising during the mounting and to allow certain constructional tolerance errors, the device according to the invention is also designed to be able to absorb movements in the longitudinal direction of the lever, i.e. the substantially vertical mounting bracket can move in relation to the longitudinal direction of the lever.

Preferably, the degrees of movement are made possible by the mounting bracket being made up of a pin fastened into the lever, in which the pin is arranged in a hole in a holding member. The pin can also be asymmetrical so that it allows a greater movement in the longitudinal direction of the lever than in its transverse direction.

By virtue of the above-described device, existing parts such as steering bearing, retaining nut and sealing washer are able to be reused. The use of pre-existing parts facilitates assembly, since the parts are already toleranced to fit together, besides which the product becomes cheaper for the end customer.

The invention is described in greater detail below, with references to the accompanying drawings.

DETAILED DESCRIPTION OF THE INVENTION

Figure 1:
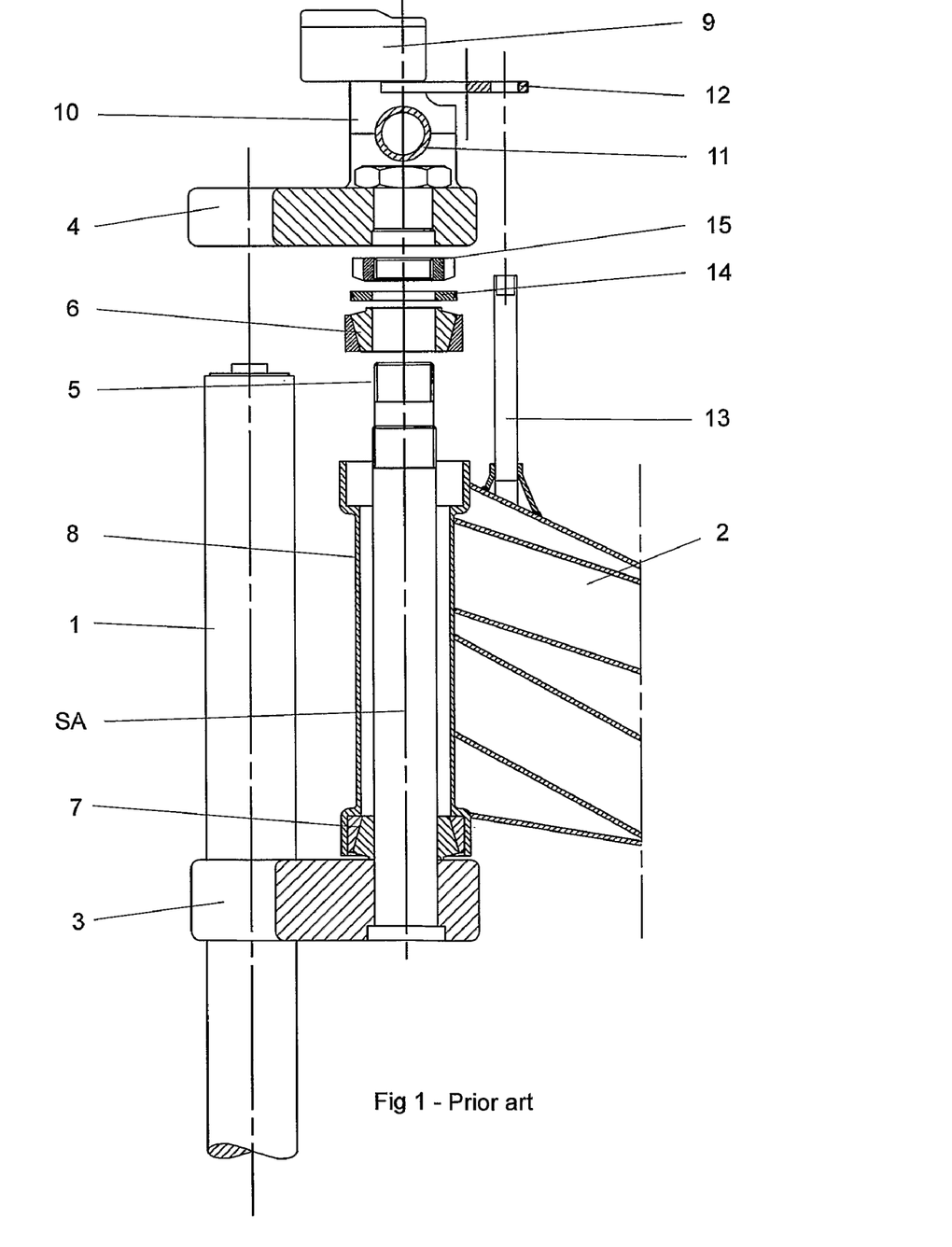
FIG. 1 shows a traditional steering damper placement on a motorcycle.

FIG. 1 shows how the front wheel suspension member or fork leg 1 of a motorcycle is traditionally joined to the front part 2 of the motorcycle frame. A section has been made through the plane of symmetry of a motorcycle level with said suspension member and, for greater clarity, the components have been shown in exploded view.

The front wheel (not shown) of the motorcycle is placed between the right fork leg 1 and the symmetrically placed left fork leg. The fork legs are mutually connected by a lower 3 and an upper part 4 rotatable about a steering axle. Should the steering damper be used on a motorcycle, as in FIGS. 1-6 and FIGS. 8-11, the rotatable parts 3, 4 are the fork crowns of the motorcycle.

Extending centrally through the fork crowns 3, 4 shown in FIG. 1 is the steering column 5, which, via the upper 6 and the lower steering bearing 7, is rotatably fixed to the steering head 8 of the motorcycle. The upper steering bearing 6 is pretensioned by a retaining nut 15, which affixes a face in the form of the upper sealing washer 14 of the steering bearing. The periphery of the upper sealing washer 15 has a groove in which a seal is placed to prevent dirt and water from penetrating into the bearing. The sealing washer 14 also disperses the force with which the retaining nut 15 pretensions the steering bearing. Rotation of the front wheel, fork crowns 3, 4 and fork legs 1 takes place about the steering axle SA. A handlebar 11 is also secured in the upper fork crown 4 via steering brackets 10.

A rotation steering damper 9' is fitted above the mounting bracket 10 of the handlebar 11 on a specially produced clamp extending between the steering brackets 10. The housing of the steering damper is thus connected to the upper fork crown 4 via the clamp and the brackets 10. The inner damping member, or the wing, which is rotatable in relation to the housing and is not shown in FIG. 1, is anchored, via a lever 12, in the frame 2 of the motorcycle via a mounting bracket 13. The mounting bracket 13 is connected to the front part 2 of the motorcycle frame. Also known but not shown are solutions which use a clamping joint around the upper part of the steering head to hold the mounting bracket, or else the mount of the fuel tank can also be utilized as a holder for the mounting bracket.

Figure 2:
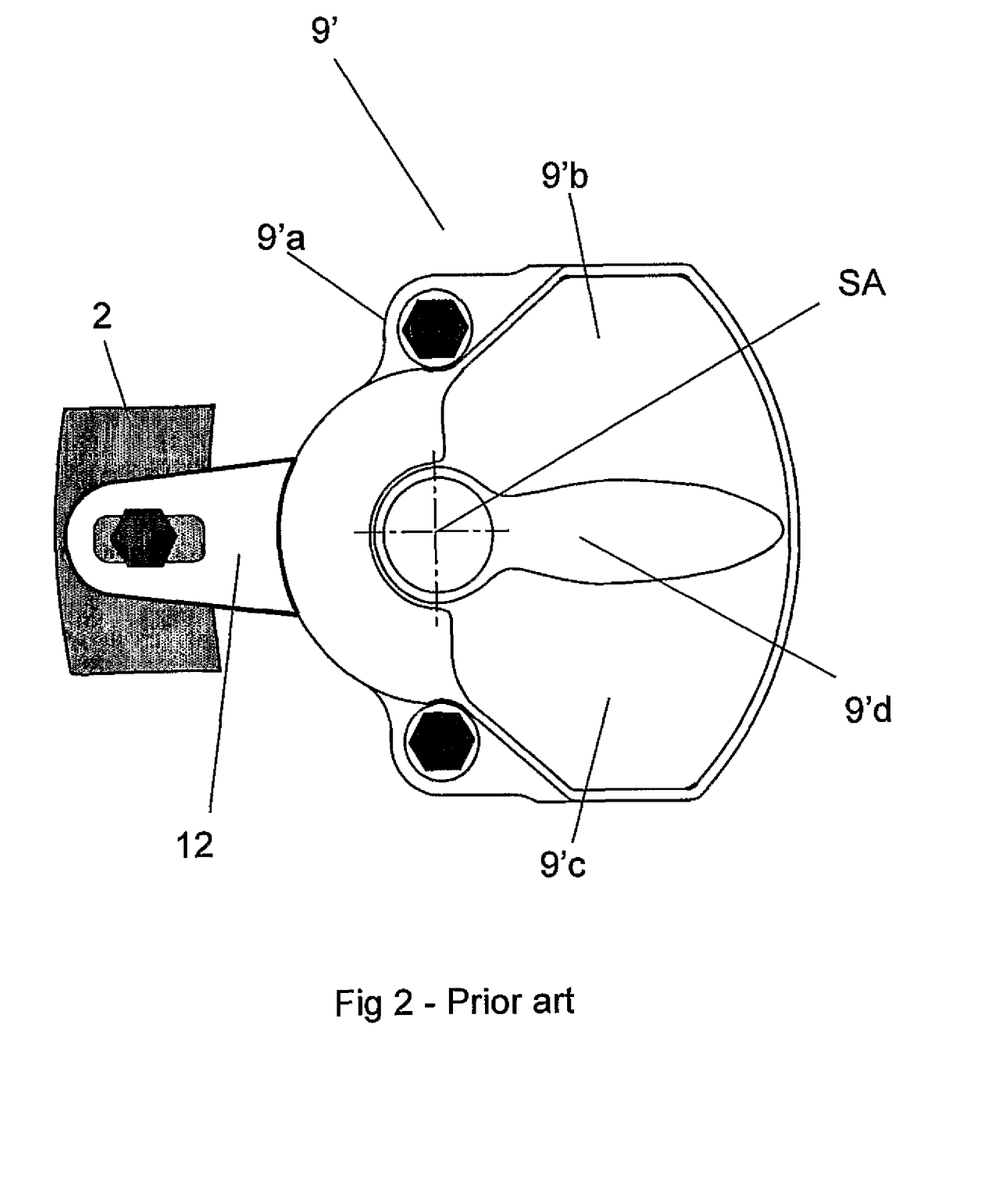
FIG. 2 shows a steering damper according to the prior art.

FIG. 2 shows a sectional view through a steering damper according to the prior art, in which the steering damper 9' comprises an outer housing 9'a enclosing a damping-medium-filled main chamber divided into two chambers 9'b, 9'c by a demarcating wing 9'd rotatable about a first wing end about the steering axle SA. The damping medium is preferably oil, possibly with various additives. The outer face of the wing end rotates in a custom-made cutout in the housing 9'a and in the first wing end the lever 12 is also fixed. The lever 12 rotates with the wing 9'd in relation to said outer housing 9'a. The lever 12 is designed to connect the steering damper 9' rotating with the steering device to the vehicle frame 2.

Figure 3A:
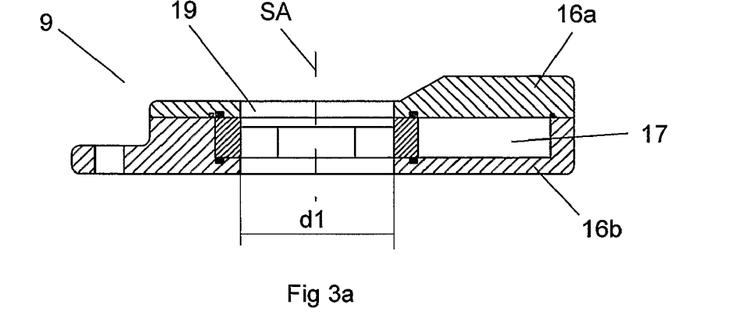
FIGS. 3a-c show the steering damper according to the invention.
Figure 3B:
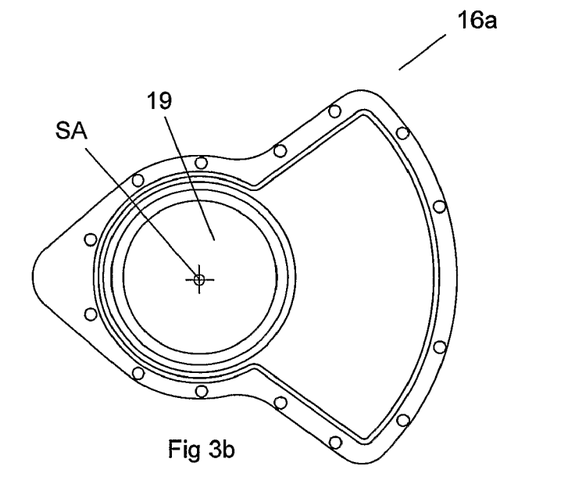
Figure 3C:
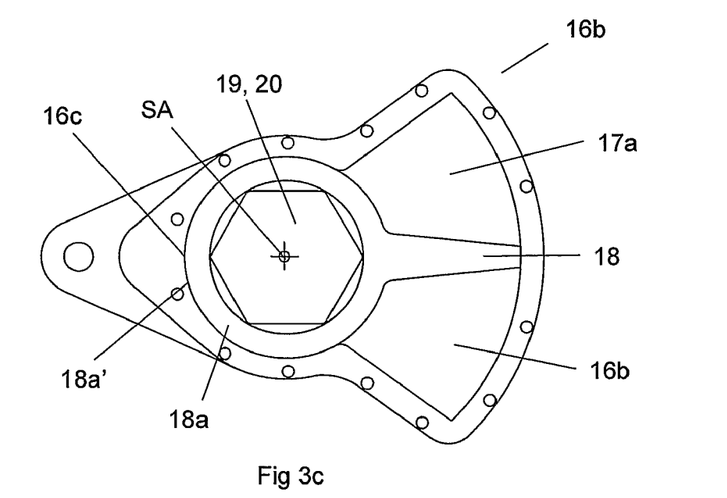

FIGS. 3a-c show the steering damper according to the invention. The steering damper 9 comprises an outer housing 16 consisting of a lid 16a and a bottom part 16b, enclosing a damping-medium-filled main chamber 17 divided into two chambers 17a, 17b by a demarcating wing 18 rotatable about a first wing end 18a about the steering axle SA. The damping medium is preferably oil, possibly with various additives. The outer face 18a' of the wing end 18a rotates in a corresponding cutout 16c in the housing 16. Extending through both the lid 16a and the lower housing 16b into the outer housing is a cavity 19, the center line of which coincides with the steering axle SA. The diameter d1 of this cavity 19 is designed to at least accommodate a fastening element 20, preferably a modified variant of the nut of the upper fork crown.

Figure 4:
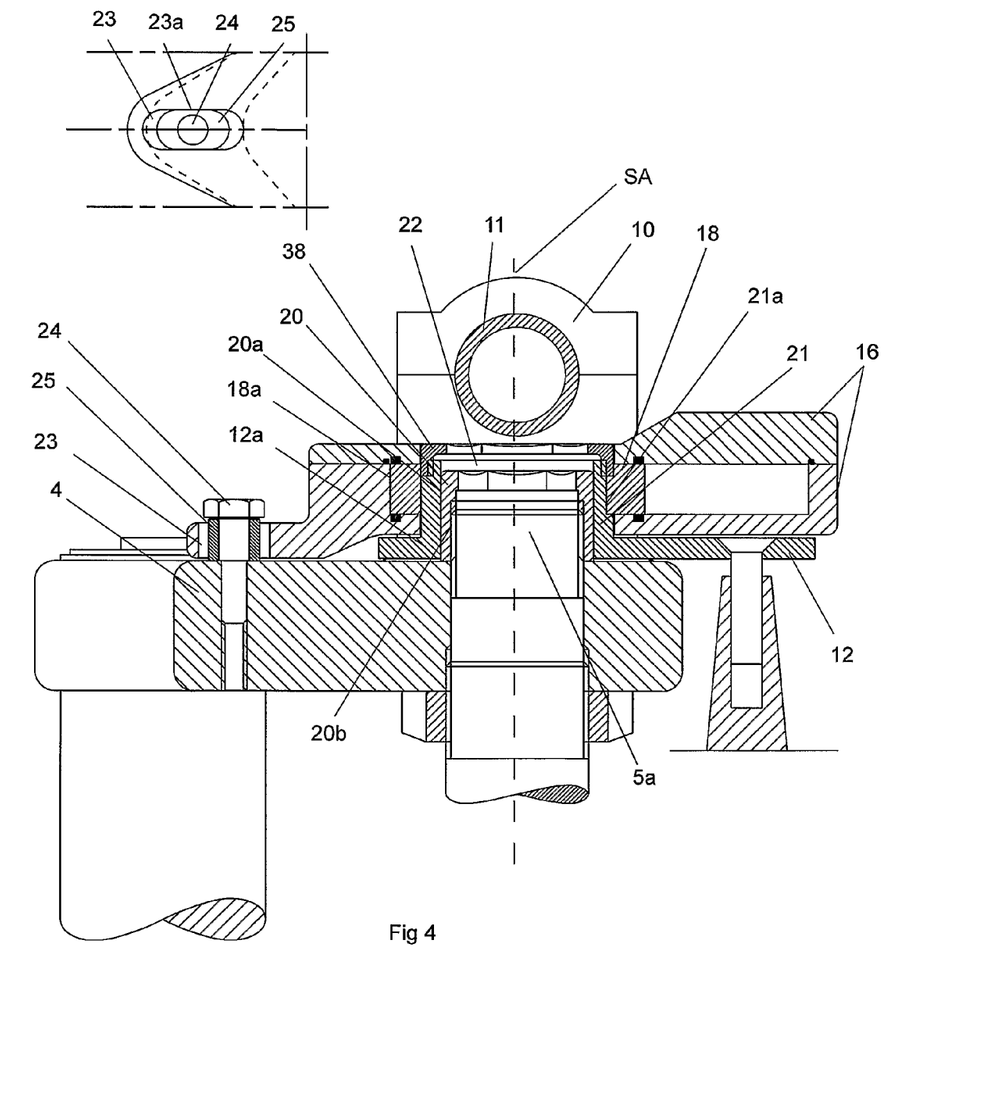
FIG. 4 shows a section of the steering damper according to the invention fitted to a part rotatable about the steering axle of a vehicle.

The placement of the fastening element 20 in relation to the steering damper 9 is shown more clearly in FIG. 4, which shows a sectional view of the steering damper and its mounting. The fastening element 20 has a cylindrical outer face 20a and, for tightening, an axially accessible inner hexagonal hole 20' of previously known type is used. By means of the fastening element 20, the axial locking of one of the parts 4, 5 rotatable about the steering axle is secured by means of a thread in the steering column 5.

FIG. 4 shows that in the first wing end 18a is also fixed the first end 12a of a lever 12. The lever 12 rotates with the wing 18 at the first lever end 12a in relation to said outer housing 16 about the steering axle SA. The lever 12 is designed to connect the steering damper 9 rotating with the steering device to the vehicle frame 2. Outside the fastening element 20, but within the diameter d1 of the same cavity 19 in the lever, there is also disposed a flange 21 lying at right angles to the lever. The flange 21 extends partially into the outer housing 16 into the cavity 19 and is preferably a part of the lever 12 and is therefore produced from one and the same material.

The cavity 19 of the steering damper is partially constituted by the inner face of the central part of the first end 18a of the wing 18 of the damper. The outer face 21a of the flange 21 is therefore enclosed by a second cavity 22 provided in the first wing end 18a.

The inner face of the second cavity 22 is configured preferably, but not only, as a hexagon, an octagon, or a spline-shaped profile of known type. The outer face 21a of the flange 21 of the lever 12 is configured with corresponding geometric configuration, so that a rotationally secured coupling is achieved. The lever 12 then rotates together with the wing 18 in relation to the outer housing 16, when the whole of the steering device rotates relative to the frame 2. The flange 21 of the lever 12 is axially joined to the central part of the wing 18a by a nut 38.

The housing 16 of the steering damper has a front part which bears against either one of the rotatable parts 3, 4, whereof the part 4 has in FIG. 4 the shape of an upper fork crown. In the front part, a continuous mounting hole 23 is provided. This mounting hole 23 enables the housing to be rotationally fixed to either one of the rotatable parts 3, 4. Fixing can be achieved either by a screw joint of known type or via a mounting hole 23 which is elongated with parallel sides, preferably about 10 mm long. In this mounting hole 23, a fastening member 24 holds a fixing member 25 against the flat and connecting sides of the mounting hole 23. The fixing member 25 is designed such that the damping housing 16 will be able to absorb a small movement in the longitudinal direction, typically up to half a mm in length, without corresponding play being encountered in the rotational direction.

Figures 5, 5A:
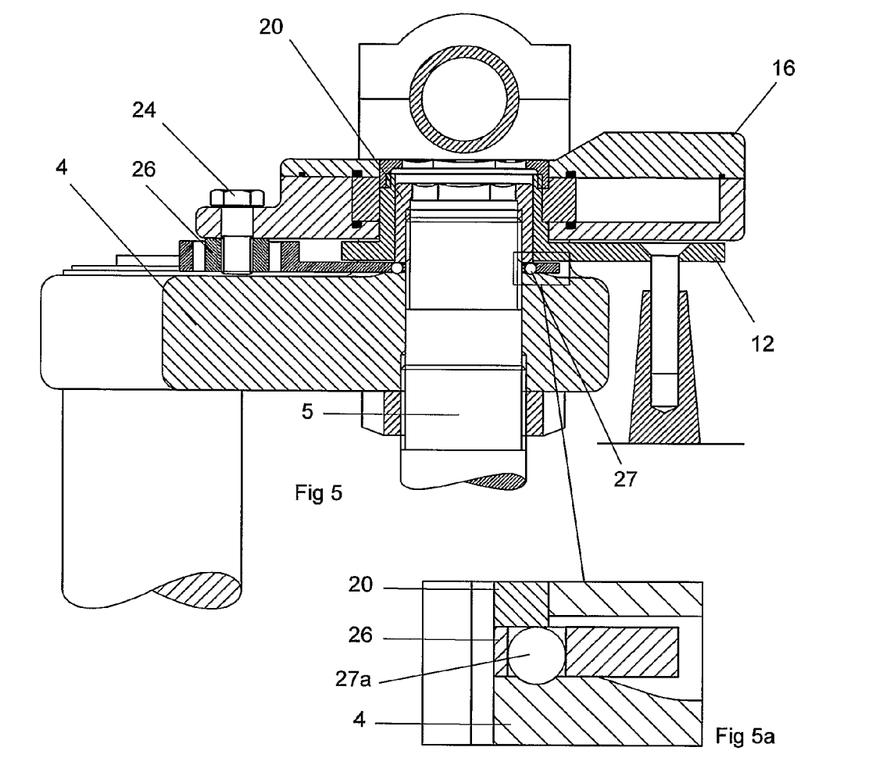
FIGS. 5a-c show three alternative ways to fit the steering axle on the part rotatable about the steering axle.
Figure 5B:
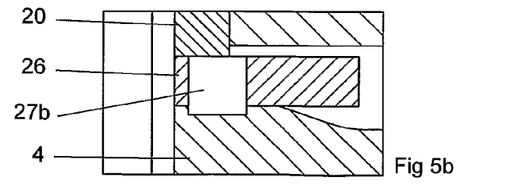
Figure 5C:
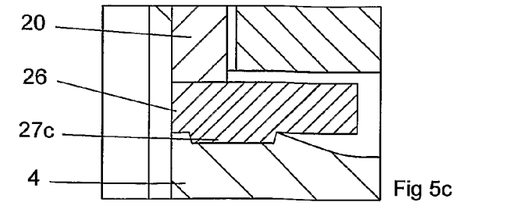

FIG. 5 shows an alternative joining of the steering damper 9 and rotatable parts 4, 5, in which the fastening element 20 of the housing instead joins the outer housing 16 to a mounting plate 26. The fastening element 20 fixes and locks in the rotational direction the mounting plate 26 in relation to the rotatable part/the fork crown 4. The fastening element 20 is designed to lock both the steering column 5 and the outer housing 16 of the steering damper to the fork crown 4, this by virtue of the fact that the tightening torque with which the fastening element 20 is affixed produces a force which connects the mounting plate 26 to the fork crown 4. Preferably, this connection and rotation locking is produced by the fact that in or on the mounting plate 26 are arranged two or more protrusions 27, which are pressed down into the fork crown 4. In the initial assembly, the protrusions 27 stamp recesses in the fork crown which prevent the rotation.

In FIG. 5a, these protrusions have the form of a ball 27a, which rests in holes in the mounting plate 26. FIG. 5b shows protrusions in the form of plugs 27b, which are also inserted in holes in the mounting plate 26. FIG. 5c shows protrusions in the form of pins 27c, which are a part of the mounting plate 26. Of course, the protrusions 27 can have forms other than those described above.

Figure 6:
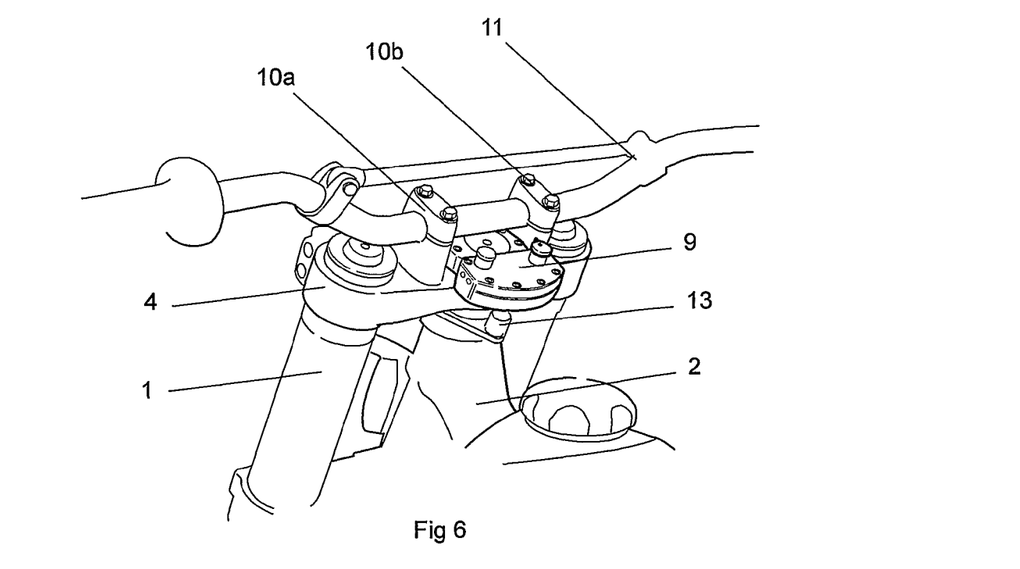
FIG. 6 shows a view of the new steering damper placement on a motorcycle.

FIG. 6 shows a view of the placement of the handlebar 11 on the upper fork crown 4 of a motorcycle. The steering damper 15 is placed between the mounting brackets 10a, 10b of the handlebar and below the handlebar 11. The lever 12 (not shown in the figure) of the steering damper is connected to the frame 2 via fastening members 13.

Figure 7:
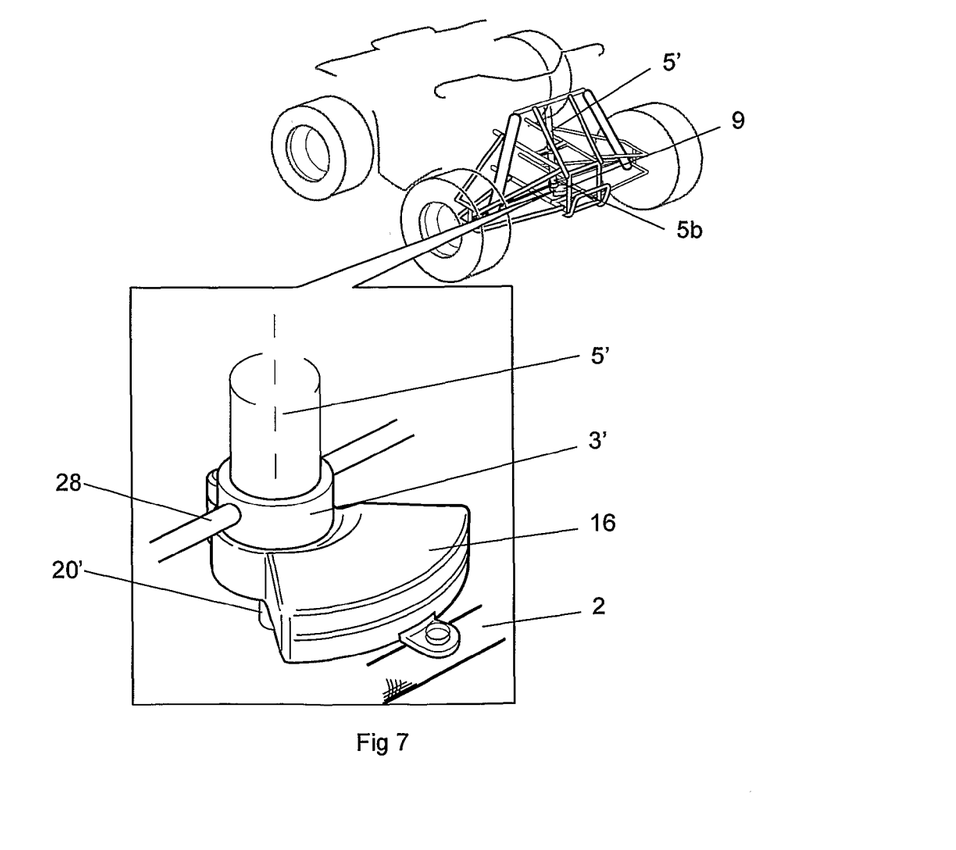
FIG. 7 shows a view of the new steering damper placement on a four-wheeled ATV.

FIG. 7 shows the placement of the steering damper 9 on a four-wheeled ATV. The part 3' rotatable about the steering axle is in this case a steering spindle to which steering arms 28 are connected. The steering damper 9 is fitted to a lower end 5b' of the steering column 5' and the fastening element 20' which fastens the steering spindle 3' to the steering column 5' is partially inserted in the outer housing 16 of the steering damper through the cavity 19 in the housing. The fastening element 20' also locks the wing disposed in the steering damper to the rotary steering column 5'. The outer housing of the steering damper is secured in the vehicle frame 2' via an extra screw joint.

Figures 8, 8A:
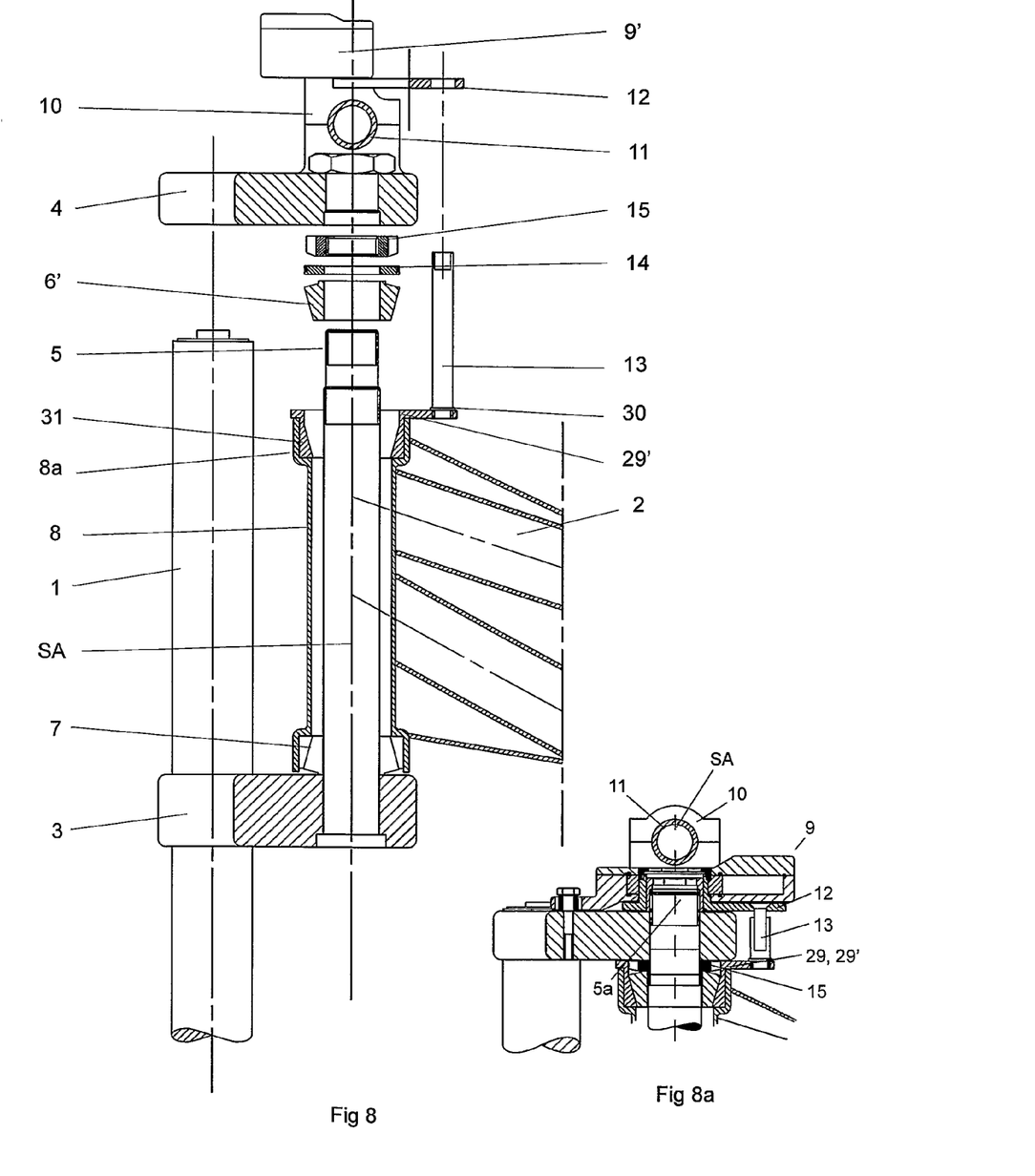
FIG. 8 shows the inventive new mounting of a steering damper of a first variant in the chassis of a vehicle.
FIG. 8a shows the inventive new mounting of a steering damper of a second variant according to the invention.

FIG. 8 shows the inventive new mounting of the mounting bracket 13 of the steering damper 9, 9' in the steering head 8. The steering damper can either be designed according to the prior art 9' and be fitted as in FIG. 8, or according to the above-described inventive design 9 and then fitted as in FIG. 8a.

The mounting bracket 13 of the lever 12 is mounted on a mounting fixture 29 consisting of a flange 30 coordinated with an outer ring 31. Other parts shown in the drawing are identical with the prior art shown in FIG. 1 and therefore also have the same reference symbols. The outer ring 31 of the mounting fixture 29 is pressed down into the upper part 8a of the steering head 8 and the flange 30 of said mounting fixture extends substantially horizontally out from the outer ring 31 and parallel with the frame 2.

Figure 9A:
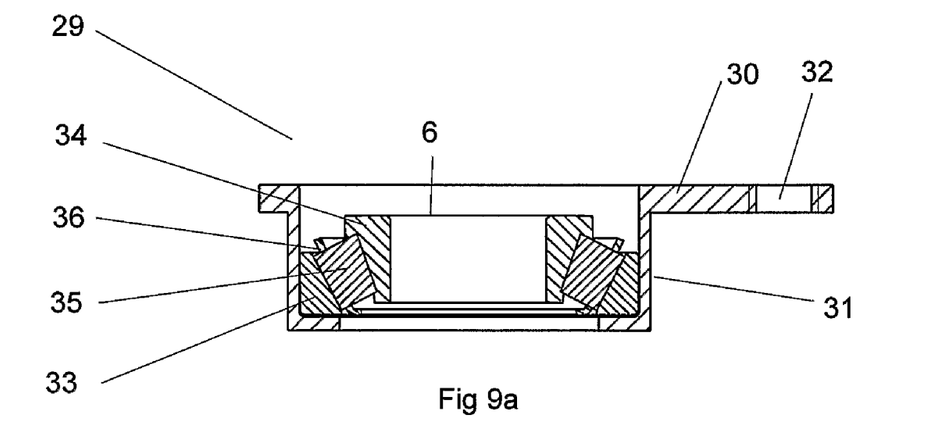
FIGS. 9a and 9b show two different variants of the mounting bracket forming the mounting fixture.
Figure 9B:
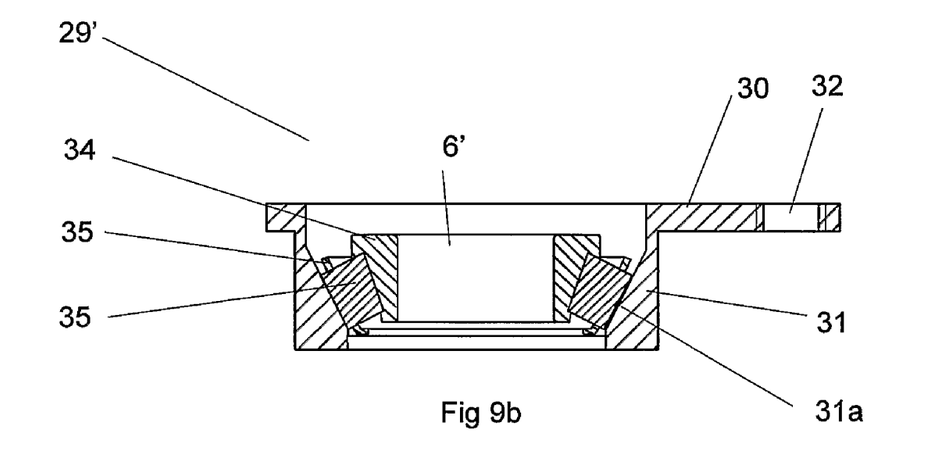

FIGS. 9a and 9b show two different variants of the mounting fixture 29, 29'. In the mounting fixture 29, 29' according to the two embodiments, the flange 30 is joined to the outer ring 31. In the flange 30 a hole 32 is bored, in which the mounting bracket 13 is fitted.

FIG. 9a shows an embodiment 29 of the mounting fixture, in which a complete steering bearing 6 is inserted in the outer ring 31. The steering bearing 6 is a conventional roller or plain bearing, preferably it is a conical roller bearing having conical antifriction rollers. Conical roller bearings in the dimensions 51 or 52 mm are the bearings which are nowadays used as steering bearings on the majority of modern motorcycle models, which means that an ordinary steering bearing, but of smaller dimension, can be used in the application.

The steering bearing is preferably made up of an outer 33 and an inner bearing ring 34, and antifriction parts 35 which are held together by a bearing cage 36. The antifriction parts 35 are mounted on the inner bearing ring 34 and move relative to the outer bearing ring 33. The antifriction parts 35 can preferably, but not only, be constituted by balls, cylindrical rollers, conical rollers or spherical rollers.

FIG. 9b shows an embodiment 29' of the mounting fixture which is matched to a modified steering bearing 6'. The modification which is made is that from the complete steering bearing 6 there is removed the outer bearing ring 33 of the bearing, so that the antifriction rollers 35 are exposed. The antifriction rollers 35 of the modified steering bearing are in this case designed to cooperate with the inner face 31a of the outer ring in such a way that the face acts as the outer bearing ring 34 of the steering bearing. The inner face 31a of the outer ring is preferably conically configured to match the bearing 6'. The steering bearing is also fully submerged in the outer ring 31 to reduce the overall height of the construction.

Figure 10:
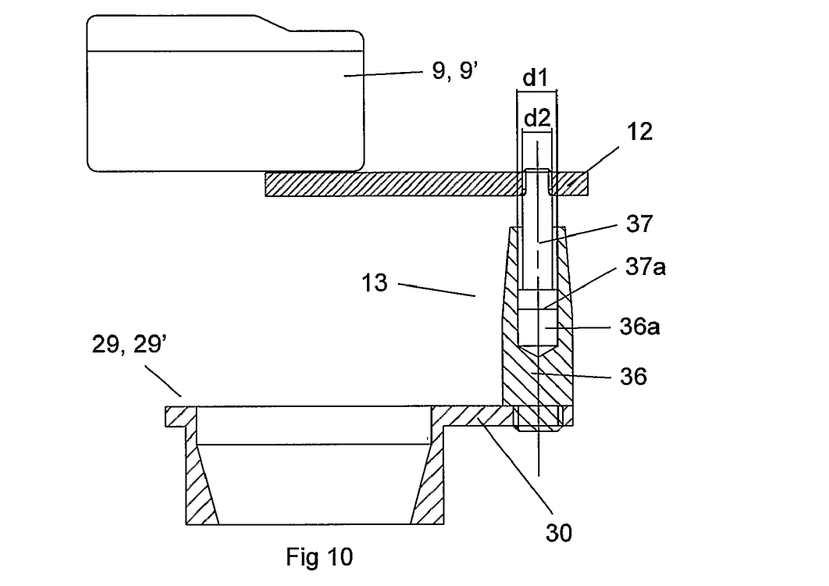
FIGS. 10 and 11 show an alternative embodiment of the securement of the lever to the mounting bracket.

FIG. 10 shows an alternative configuration of the securement of the lever 12 to the mounting bracket 13, in which the mounting bracket 13 can move in relation to the longitudinal direction of the lever 12.

On the flange 30 of the mounting fixture 29 there is fitted a holding member 36, in which a hole 36a is provided. Screwed onto the lever 12 is a pin 37. In the realization of the pin 37, it is advantageous to be able to absorb a small variation in length.

In FIG. 10, this is achieved by the pin 37 of the lever having a diameter d1 on its end 37a which fits with acceptable precision into the cavity 36a in the holding member 36. The pin 37 has for the rest a smaller diameter d2, so that any variation in length can be absorbed by a slight bending of the pin. Other variants for producing a possible movement in the securement of the mounting bracket 13 to the lever 12 are also possible. For example, the outer end 37a of the pin, having the diameter d1, can be wholly or partially spherical in shape, or else the pin can be asymmetrically configured such that it allows a greater movement in the longitudinal direction of the lever 12 than in its transverse direction. Preferably, it can move five times more in its longitudinal direction than in its transverse direction and the movement in the longitudinal direction can be about 0.5 mm in total.

Figure 11:
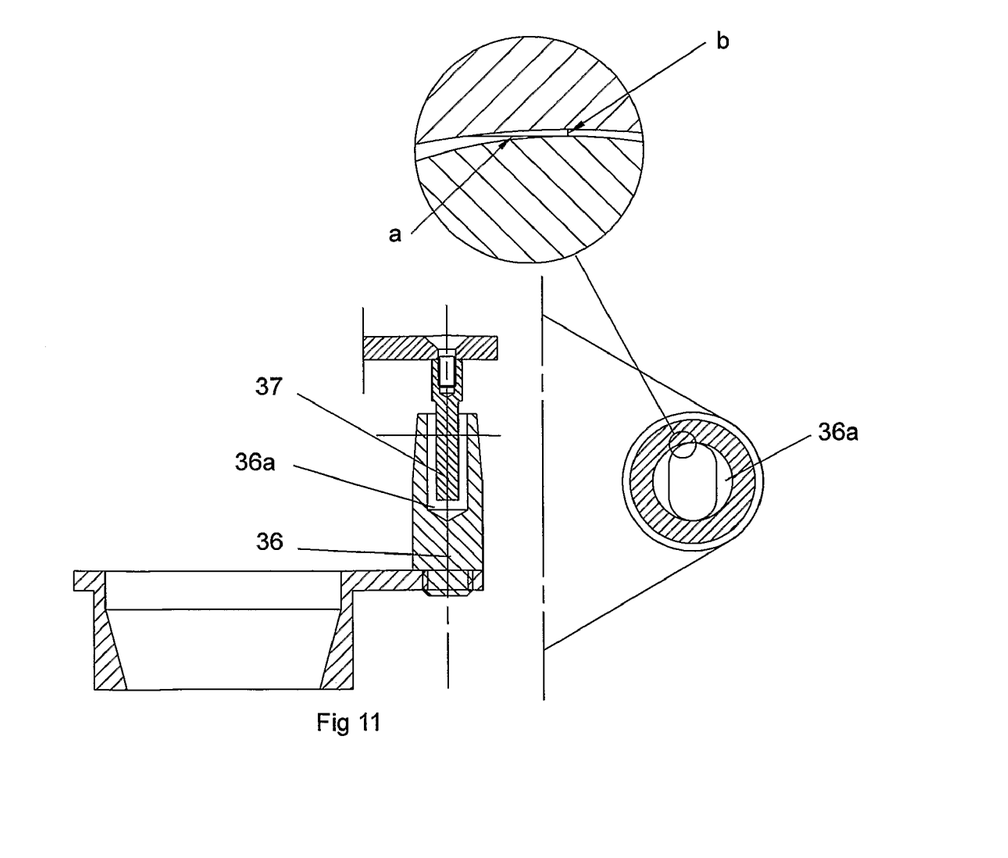

In FIG. 11, another embodiment of the pin 37 of the lever is shown, in which the pin has an oval cross section and a smaller edge radius, for example 3 to 4 mm. The hole 36a in the holding member 36 is larger than the edge radius of the pin, which is 6 mm, for example. In this way, the pin 37 of the lever can absorb a variation corresponding to a distance a in the longitudinal direction, yet still has a small and virtually play-free variation corresponding to the distance b in the lateral direction. In the figure, the pin 37 of the lever is fixed in the lever by means of a screw joint. An embodiment can be imagined in which the pin and the lever are realized in one piece and produced by means of forging or diecasting.

The invention is not limited to the embodiment shown by way of example above, but can be modified within the scope of the following patent claims and the inventive concept.

The invention claimed is:

1. A steering damper designed for use on a vehicle which has a handlebar connected to at least one part rotatable about a steering axle coinciding with the center of a steering column, in which the steering damper comprises an outer housing enclosing a damping-medium-filled main chamber divided into two chambers by a demarcating wing rotatable about a first wing end, the outer face rotates in a custom-made cutout in the housing and in the first wing end there is also fixed a first end of a lever, in which the lever rotates with the wing about the steering axle and the first lever end in relation to said outer housing, and in which said lever, via a mounting fixture, also connects the steering damper rotating with the steering device to the vehicle frame, characterized in that in the outer housing there is a cavity, the center line of which coincides with the steering axle, and in that the diameter of this cavity is designed to accommodate a fastening element which joins the steering damper to the part rotatable about the steering axle.

2. The steering damper as claimed in claim 1, characterized in that in the cavity there is disposed a flange at right angles to the lever extending in the outer housing.

3. The steering damper as claimed in claim 2, characterized in that the outer face of the flange is enclosed by a cavity provided in the first wing end of the wing providing demarcation in the housing.

4. The steering damper as claimed in claim 3, characterized in that the outer face of the flange and the inner face of the first wing end are locked relative to each other in the rotational direction.

5. The steering damper as claimed in claim 1, characterized in that the fastening element has a cylindrical outer face and its inner face comprises a thread which cooperates with a threaded upper part on or connected to the steering column.

6. The steering damper as claimed in claim 1, characterized in that the steering damper is designed for use on a motorcycle in which the part rotatable about the steering axle is a fork crown.

7. The steering damper as claimed in claim 6, characterized in that the fastening element is designed to lock both the steering column and the outer housing of the steering damper to the fork crown.

8. The steering damper as claimed in claim 7, characterized in that the fastening element presses on a mounting plate, locked on the outer housing with a fastening member, so that the mounting plate is connected to the fork crown and prevents rotation between the fork crown and the outer housing.

9. The steering damper as claimed in claim 8, characterized in that in or on the mounting plate there are arranged protrusions, which are pressed down into the fork crown and produce rotation lockings.

10. The steering damper as claimed in claim 1, characterized in that the steering damper is designed for use on a four-wheeled ATV in which the part rotatable about the steering axle is a steering spindle to which steering arms are connected.

11. The steering damper as claimed in claim 10, characterized in that fastening element which fastens the steering spindle to a steering column is partially inserted in the outer housing of the steering damper through the cavity in the housing.

12. The steering damper as claimed in claim 10, characterized in that the outer housing of the steering damper is locked to the frame via an extra screw joint.

13. A device for securing a steering damper to a vehicle frame, in which the frame includes a steering head and an upper steering bearing pretensioned by a retaining nut, and in which to the frame there is fitted a steering device rotating about the steering axle and the steering column and including a handlebar connected via steering brackets to a fork crown, on the steering device there is also mounted an outer housing, which belongs to the steering damper and encloses a damping-medium-filled main chamber divided into two chambers by a demarcating wing rotatable about a first wing end, the outer face of the wing end rotates in a custom-made cutout in the housing, and in the first wing end there is also fixed a lever which rotates with the wing in relation to said outer housing, and in which said lever is also connected to the vehicle frame, characterized in that the lever is connected via a mounting bracket to a mounting fixture consisting of a flange attached to an outer ring, in which the outer ring is designed to be pressed down into the upper part of the steering head, and in which in the outer ring there is disposed a complete or modified steering bearing.

14. The device as claimed in claim 13, characterized in that a complete steering bearing is made up of at least one outer and one inner bearing ring, as well as antifriction parts which are held together by a bearing cage in which the antifriction parts are mounted on the inner bearing ring and move relative to the outer bearing ring.

15. The device as claimed in claim 13, characterized in that, in the assembly, the steering bearing designed for the upper part of the steering head and original to the original vehicle can be used.

16. The device as claimed in claim 13, characterized in that the steering bearing which is introduced into the outer ring is a modification of the original steering bearing.

17. The device as claimed in claim 14, characterized in that the modification which is made to the steering bearing is that from the complete steering bearing the outer bearing ring is removed, so that the antifriction parts are exposed.

18. The device as claimed in claim 17, characterized in that the inner face of the outer ring acts as the outer bearing ring of the steering bearing, so that the antifriction parts of the steering bearing act directly against the outer ring.

19. The device as claimed in claim 13, characterized in that the steering bearing is fully submerged in the outer ring.

20. The device as claimed in claim 13, characterized in that the steering bearing is pretensioned by the ordinary retaining nut of the steering bearing, which retaining nut is screwed against a threaded upper part of the steering column and affixes a face in the form of an ordinary upper sealing washer.

21. The device as claimed in claim 13, characterized in that the mounting bracket is made up of a pin and a holding member arranged in such a way in relation to each other that the fastening element can move in the longitudinal direction of the lever.

22. The device as claimed in claim 21, characterized in that the degrees of movement are made possible by the pin fastened in the lever and extending into a hole provided in the holding member.

23. The device as claimed in claim 22, characterized in that the pin is asymmetrical and such that it allows a greater movement in the longitudinal direction of the lever than in its transverse direction.

\* \* \* \* \*

UNITED STATES PATENT AND TRADEMARK OFFICE
CERTIFICATE OF CORRECTION

| | | |
|---|---|---|
| PATENT NO. | : 7,891,681 B2 | Page 1 of 1 |
| APPLICATION NO. | : 12/529571 | |
| DATED | : February 22, 2011 | |
| INVENTOR(S) | : Leif Gustafsson | |

It is certified that error appears in the above-identified patent and that said Letters Patent is hereby corrected as shown below:

Column 9, Line 32, Claim 1:

After "the outer face"
Insert -- of the wing end --

Signed and Sealed this
Seventeenth Day of May, 2011

David J. Kappos
*Director of the United States Patent and Trademark Office*